United States Patent [19]

Chattey

[11] Patent Number: 5,061,122
[45] Date of Patent: Oct. 29, 1991

[54] METHOD OF CONSTRUCTING A MAN-MADE SEA DEFENSE SYSTEM IN THE OPEN OCEAN

[76] Inventor: Nigel Chattey, 150 Cedarlawn Rd., Irvington-on-Hudson, N.Y. 10533

[21] Appl. No.: 578,761

[22] Filed: Sep. 6, 1990

[51] Int. Cl.[5] .............................................. E02B 17/02
[52] U.S. Cl. ..................................... 405/203; 405/14; 405/21; 405/217
[58] Field of Search ........................... 405/204, 11–14, 405/32, 34, 21, 15, 207, 274, 277, 209, 210, 217

[56] References Cited

U.S. PATENT DOCUMENTS

| | | | |
|---|---|---|---|
| 559,116 | 4/1896 | Baldwin | 405/204 X |
| 946,841 | 1/1910 | Gilman | 405/11 |
| 1,310,461 | 7/1919 | Williams | 405/204 |
| 1,949,680 | 3/1934 | Ebner | 405/274 |
| 2,938,353 | 5/1960 | Vorenkamp | 405/207 |
| 4,436,447 | 3/1984 | Crowe | 405/32 X |
| 4,555,201 | 11/1985 | Paoluccio | 405/21 X |
| 4,648,752 | 3/1987 | Guy et al. | 405/277 X |
| 4,655,637 | 4/1987 | Vignocchi | 405/32 X |
| 4,784,520 | 11/1988 | Stevens | 405/21 |

Primary Examiner—Dennis L. Taylor
Attorney, Agent, or Firm—Bruce L. Adams; Van C. Wilks

[57] ABSTRACT

A man-made sea defense system is constructed using floatable sea-defense caissons which are floated in the ocean to a pre-selected ocean site and then sunk to the ocean floor and connected in end-to-end relation to form a line of sea-defense caissons whose bottoms are secured in place on the ocean floor and whose tops extend above the ocean surface. The opposite ends of the line of sea-defense caissons are anchored by anchor tower caissons which extend higher above the ocean surface than the sea-defense caissons. A plurality of storage caissons are secured in place to the ocean floor on the leeward side of the line of sea-defense caissons for storing bulk materials. The storage caissons may be connected to the line of sea-defense caissons in a closed loop configuration to define a sheltered area on the leeward side of the sea-defense caissons. The sheltered area may remain filled with seawater to form a wet polder or may be pumped dry and filled with dry material to form a dry polder.

15 Claims, 5 Drawing Sheets

METHOD OF CONSTRUCTING A MAN-MADE SEA DEFENSE SYSTEM IN THE OPEN OCEAN

BACKGROUND OF THE INVENTION

The present invention relates generally to the construction of sea defense systems in the open ocean, and more particularly to the construction of a man-made sea defense system using floatable caissons which are transported by floatation to a preselected ocean site and sunk in place to form the sea defense system.

Various methods have been developed for constructing artificial, man-made islands in the ocean. One method comprises the construction of steel and/or concrete platforms which stand on the ocean floor and the tops of which stand clear of the ocean surface. A major drawback of platform technology is that it is too expensive, in terms of construction and maintenance, to be used to construct large-scale artificial, man-made islands of any appreciable size. For example, it would not be economically feasible to use platform technology to construct an island large enough to provide even 100 acres of protected land or water, and it would be prohibitively expensive to construct such an island containing a thousand or more acres of protected land or water.

Another method is the construction of sea-walls by driving steel and/or concrete pilings deep into the ocean floor to form a containment structure which is then filled on the inside with dredged material. Using current sea-wall technology, it would not be economically feasible to construct a sea-wall capable of withstanding the extreme ocean environments of the open sea.

A widely used method is the construction of breakwaters, typically formed of rock, concrete blocks, concrete tetrapods and the like, which are filled on the inside with dredged material. Though breakwaters can be constructed to withstand even the most extreme ocean environments, they represent a large and permanent environmental "footprint⇌ on the ocean floor, especially if filled with dredged material.

Another method is the use of caissons, typically constructed of concrete and/or steel, which may be of either the floating or sunken type. A floating caisson floats on the ocean surface and is anchored to the ocean floor. A sunken caisson, on the other hand, rests directly on the ocean floor and may, depending on its construction, penetrate into the ocean floor to aid in anchoring the caisson in place. Floating caissons present a danger of breaking loose in severe wind and wave conditions, such as during a hurricane or typhoon, regardless of how strongly the caissons are anchored. This is an extremely dangerous condition and results in a breach of the sea defense system which, in turn, destroys the integrity of the protected area behind the caissons. Similarly, sunken caissons, even though large enough to rest on, or even penetrate, the ocean floor, also present a danger of breaking loose due to their hydrodynamic characteristics. For example, when severe storm waves and winds slam into the seaward side of a sunken caisson, the wind and wave forces create both a lifting force tending to lift the caisson off the ocean floor and a turning moment tending to turn the caisson—either of which if large enough in magnitude can lead to a caisson breaking loose thus resulting in a breach of the sea defense system.

Each of these methods of constructing artificial, man-made islands in the open ocean has one or more technical, economical and environmental problems associated with it. As a consequence, a few, if any, large-scale artificial, man-made islands have been built in the open ocean and, insofar as known to applicant, no such man-made islands have been built in open ocean waters in depths capable of taking all classes of sea-going vessels and subject to full force (hurricane and typhoon) waves and winds such as exist along, and off, the open coastlines surrounding the Atlantic, Pacific and Indian Oceans. Further complicating the problem of constructing artificial, man-made islands in the open ocean is the growing need to build any such complex so that, at least from an environmental or navigational standpoint, it can be de-mounted and removed following the end of its useful life thereby returning the ocean to, or as close as possible to, its pre-construction state.

SUMMARY OF THE INVENTION

One object of the present invention is to solve the aforementioned problems associated with prior art methods of constructing artificial, man-made islands.

Another object of the present invention is to provide a method of constructing a man-made sea defense system which is economically and technically feasible and which is environmentally benign.

A further object of the present invention is to provide a method of constructing a man-made sea defense system in the open ocean capable of withstanding maximum-force winds and waves generated at the site of the sea defense system.

Another object of the present invention is to provide a method of constructing a man-made sea defense system at an open ocean site at depths in the range of 20 to 80 feet and even up to 150 feet.

Yet another object of the present invention is to provide a method of constructing a man-made sea defense system which can be de-mounted and removed following the end of its useful life thus returning the ocean as closely as possible to its pre-construction state.

These as well as other objects and features of the invention are attained by constructing a man-made sea defense system using floatable sea-defense caissons which are floated in the ocean to a pre-selected ocean site and then sunk to the ocean floor and connected in end-to-end relation to form a line of sea-defense caissons whose bottoms are secured in place on the ocean floor and whose tops extend above the ocean surface. The opposite ends of the line of sea-defense caissons are preferably anchored by anchor tower caissons. A plurality of storage caissons are secured in place to the ocean floor on the leeward side of the line of sea-defense caissons for storing bulk materials. The storage caissons may be connected to the line of sea-defense caissons in a closed loop configuration to define a sheltered area on the leeward side of the sea-defense caissons. The sheltered area may remain filled with seawater to form a wet polder or may be pumped dry and filled with dry material to form a dry polder.

The foregoing as well as other objects, features and advantages of the invention will become apparent to those of ordinary skill in the art upon a reading of the following detailed description of the invention when read in conjunction with the accompanying drawings.

DETAILED DESCRIPTION OF THE INVENTION

Figure 1:
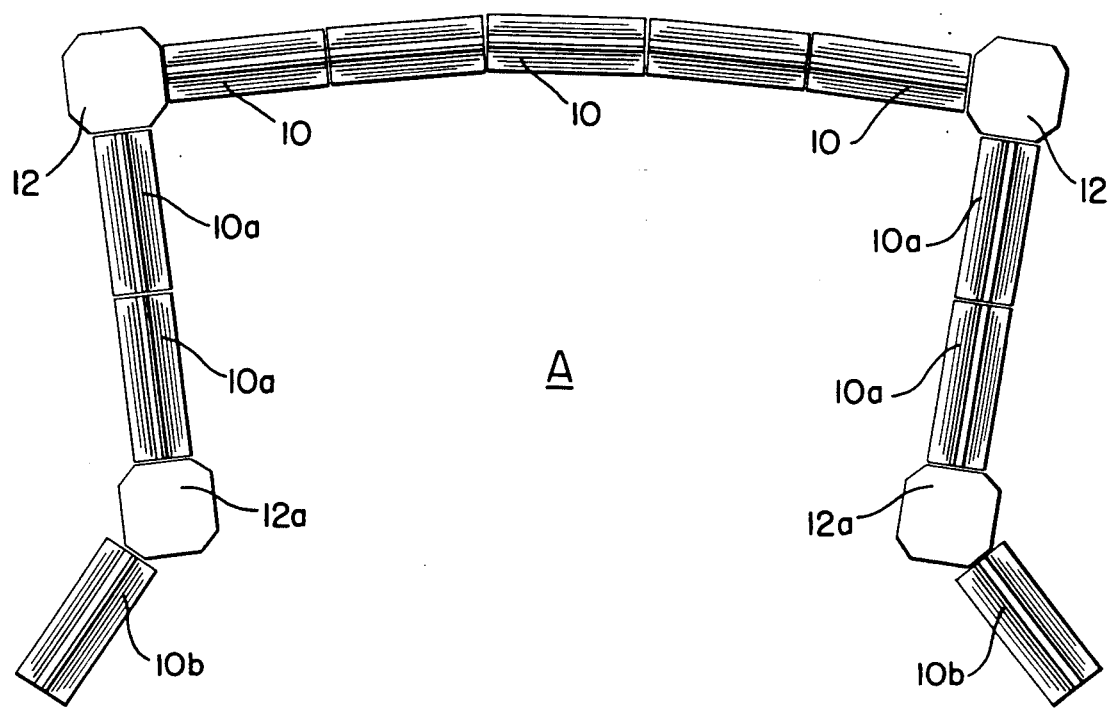
FIG. 1 is an explanatory plan view showing one embodiment of a sea defense system constructed according to the principles of the present invention.

One embodiment of a man-made sea-defense system constructed according to the present invention is shown in FIG. 1. FIG. 1 is an explanatory plan view of a sea defense system constructed at a preselected ocean site in the open ocean. The sea defense system is comprised of a main line of sea-defense caissons 10 which, as described hereinafter, are secured in place on the ocean floor and project above the ocean surface. The sea-defense caissons are connected in end-to-end relation, and any number of caissons 10 may be used depending on the desired size of the protected area and the scale of the maximum wind and wave forces generated at the selected site. An anchor tower caisson 12 is connected to the end of each of the endmost caissons 10 in the main line of sea-defense caissons. The anchor tower caissons 12 are securely anchored to the ocean floor and extend above the level of the ocean surface.

In the embodiment shown in FIG. 1, the sea-defense caissons 10 are connected in a line which preferably curves outwardly in the direction of the prevailing winds and waves thereby creating a protected area A on the leeward side of the line of caissons. To further enclose and shelter the protected area A, secondary lines of sea-defense caissons 10a are connected to the anchor tower caissons 12 and extend therefrom in the leeward direction. Additional anchor tower caissons 12a are connected to the ends of the endmost secondary sea-defense caissons 10a and, as a further measure of protection, secondary sea-defense caissons 10b are connected to the anchor tower caissons 12a.

As shown in FIG. 1, the outwardly curved main line of sea-defense caissons 10 defines, relative to the oncoming winds and waves, an arch anchored at both ends by the corner anchor tower caissons 12. In accordance with classic "arch theory", such an arch-shaped arrangement of sea-defense caissons 10 can withstand much greater wind and wave forces than would otherwise be possible if the caissons 10 were arranged in a straight line. The integrity of the sea defense system is further strengthened by the secondary lines of sea-defense caissons 10a which extend radially inwardly, like the spokes of a wheel, toward the center of curvature of the curved main line of sea-defense caissons 10.

In accordance with the invention, the particular number of sea-defense and anchor tower caissons, and the arrangement of the caissons, will depend on the desired size of the area to be protected, the depth of the ocean at the selected site, and the scale and direction of the maximum wind and wave forces generated at the selected site. For example, one or more anchor tower caissons 12 may be interposed along the main line of sea-defense caissons 10 in addition to the two corner anchor tower caissons. The leeward side of the protected area A may, if desired, be closed with a line of sea-defense caissons 10 to completely enclose the protected area A. A sea-lock may also be provided, either in one of the caissons or between two adjoining caissons, to permit ships to enter and exit the protected area A. By way of example, the area A protected by the sea defense system may be made as small as, for example, 20 acres or as large as up to 1000 acres or more.

Figure 2:
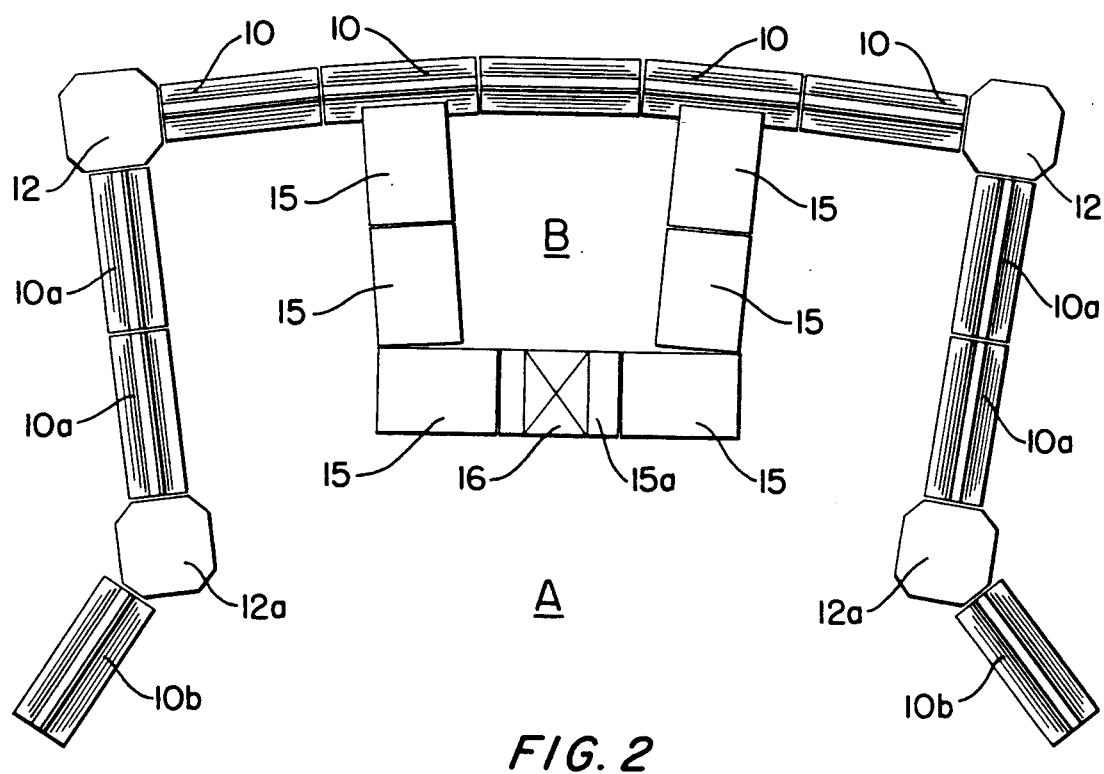
FIG. 2 is an explanatory plan view of a second embodiment of a sea defense system constructed according to the principles of the present invention.

FIG. 2 shows an embodiment of sea defense system in which a plurality of storage caissons 15 are provided on the leeward side of the line of sea-defense caissons 10 in the protected area A. In this embodiment, the storage caissons 15 are connected in a closed loop configuration with the line of sea-defense caissons 10 to form an enclosed area B. In this arrangement, two of the storage caissons 15 are connected to the leeward sides of two sea-defense caissons 10, and the storage caissons 15 are interconnected to one another to completely enclose the area B. The enclosed area B may remain filled with water to form a wet polder. One of the storage caissons 15a may be provided with a sea-lock 16 for permitting ships to enter and leave the enclosed area B. In the case of a wet polder, the body of water in the enclosed area B is completely surrounded by caissons and, from an environmental standpoint, this presents an ideal area for transferring bulk materials between vessels and the storage caissons 15. In the event of a spill or other unwanted discharge, the discharged material Will be confined to the body of water within the enclosed area B thereby enabling economic and thorough cleanup of the discharged material. The wet polder thus functions as a secure spill containment area.

Alternatively, the water within the enclosed area B may be removed and replaced by a desired level of dry fill material to form a dry polder. The fill material may be dredged from the ocean floor or may be manufactured materials. In the event the fill materials are subject to leaching wastes into the ocean, the inner walls of the caissons and the floor of the dry polder can be lined with impervious mats to prevent leaching thus creating a secure dry material containment area.

The storage caissons 15, being on the leeward side of the line of sea-defense caissons 10, need not be as seaworthy as the caissons 10. These storage caissons may be of conventional design and are equipped with the necessary piping, access openings and the like to permit the transfer of bulk materials into and out of the storage caissons.

The storage caissons 15 also function to further strengthen the integrity of the sea defense system. As shown in FIG. 2, the storage caissons 15 are preferably arranged in lines that extend radially inwardly, like the secondary lines of sea-defense caissons 10a, toward the center of curvature of the curved main line of sea-defense caissons 10.

Figure 3:
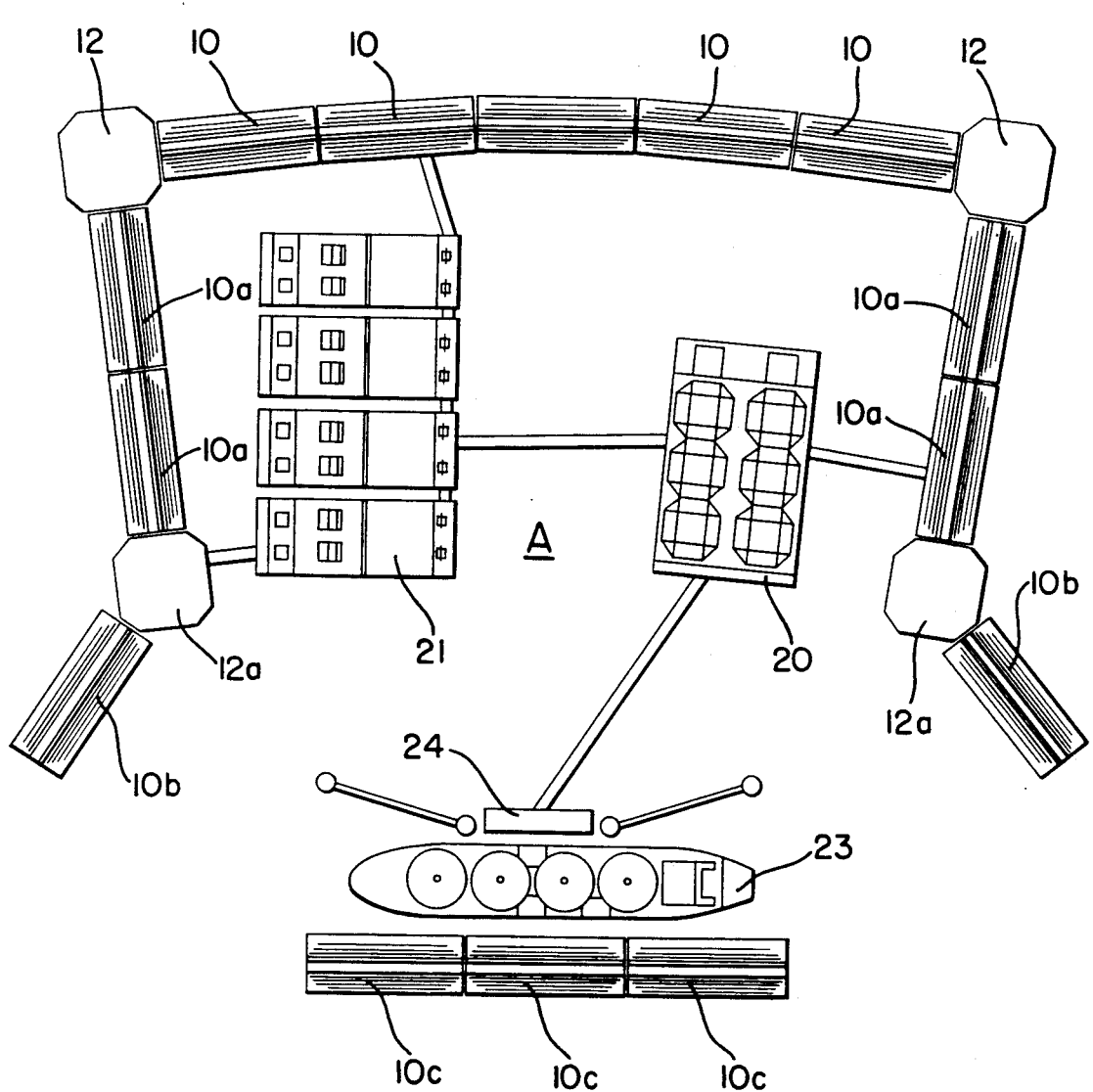
FIG. 3 is an explanatory plan view of a third embodiment of a sea defense system constructed according to the principles of the present invention.

Another embodiment of the sea defense system is shown in FIG. 3. In this embodiment, a marine storage platform 20 and a marine power plant 21 are anchored or otherwise secured in the protected area A. A line of sea-defense caissons 10c, in this case three, are provided at the leeward side of the protected area A to provide a sheltered area for a tanker or other vessel 23. By way of example, the vessel 23 may be an LNG tanker for delivering liquified natural gas to the storage platform 20 for use by the power plant platform 21 in generating electric power. A loading jetty 24 is provided adjacent the docking area, and suitable conduits, pumps and the like are provided for transporting the liquified natural gas to the various facilities. The sea defense system can likewise be used to generate electric power using liquified petroleum gas or crude oil. The sea defense system may also be used to process other materials, such as petroleum products, petrochemicals and other chemicals, waste materials, etc., or as a storage complex, or for other uses.

Figure 4:
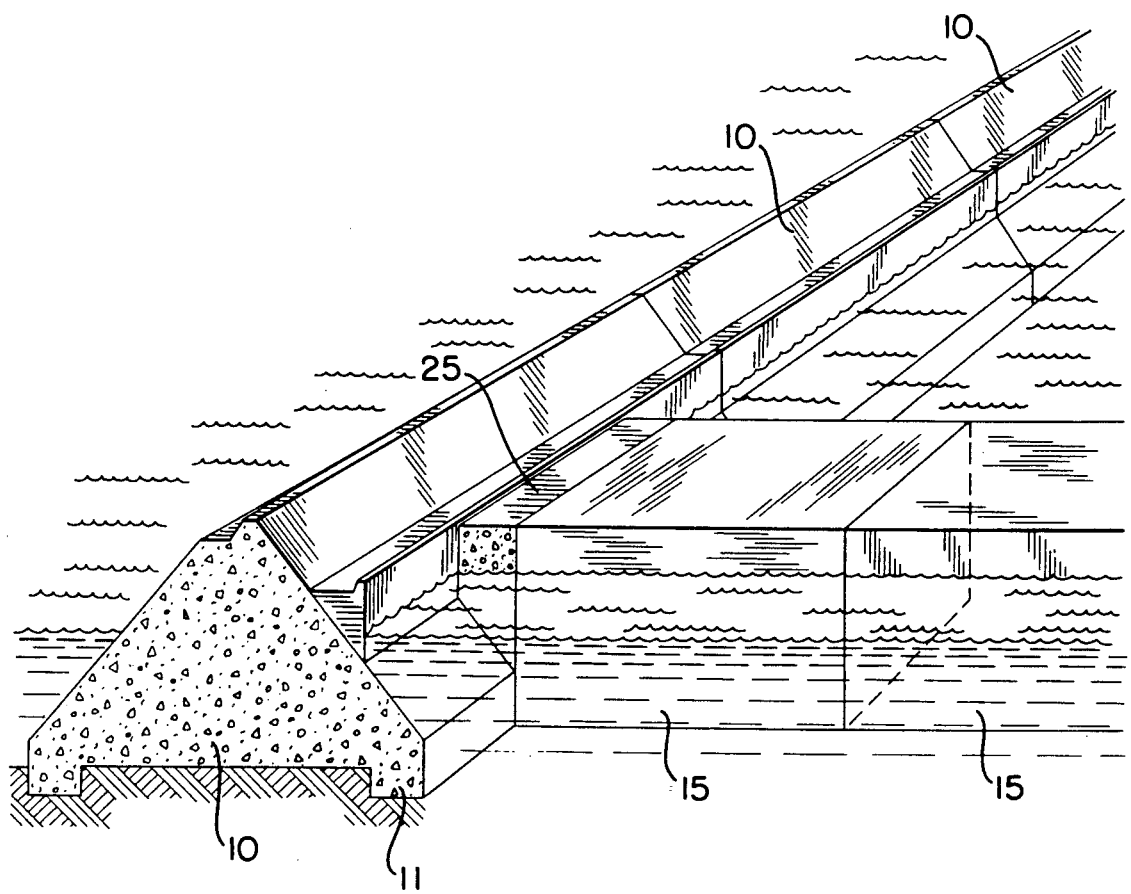
FIG. 4 is an explanatory perspective view showing the interconnection of sea-defense caissons and storage caissons.

FIG. 4 shows the general configuration of the sea-defense caissons 10 and the storage caissons 15. The storage caissons 10 are preferably all of similar shape and construction. Each caisson has a tapered cross-section that tapers outwardly in a direction from the top to the bottom of the caisson. The bottom of the caisson is provided with an annular skirt 11 which, as described hereinafter, helps secure the caisson bottom to the ocean floor by suction. The sea-defense caissons 10 are preferably comprised of reinforced concrete. The caissons 10 are constructed onshore and, to help render the caissons sufficiently buoyant to be floated to the desired ocean site, air chambers may be formed in the caissons.

The storage caissons 15 are of conventional design and may, for example, have a rectangular cross-section. The storage caissons need not be as rugged and durable as the sea-defense caissons and thus can be manufactured more easily and at lesser expense. To enable connection of the storage caissons 15 to the sloped side of the sea-defense caisson 10, an interface caisson 25 is provided, the interface caisson being configured to mate on one side with the sloped side of the sea-defense caisson 10 and on the other side with the end of the storage caisson 15. By such a construction, wind and wave forces exerted on the seaward side of the sea-defense caisson 10, which would tend to turn the caisson, will wedge the interface caisson 25 more tightly between the sea-defense and storage caissons thereby increasing the resistance to turning of the sea-defense caisson 10. The storage caissons 15 and interface caisson 25 are likewise preferably comprised of reinforced concrete.

Figure 5:
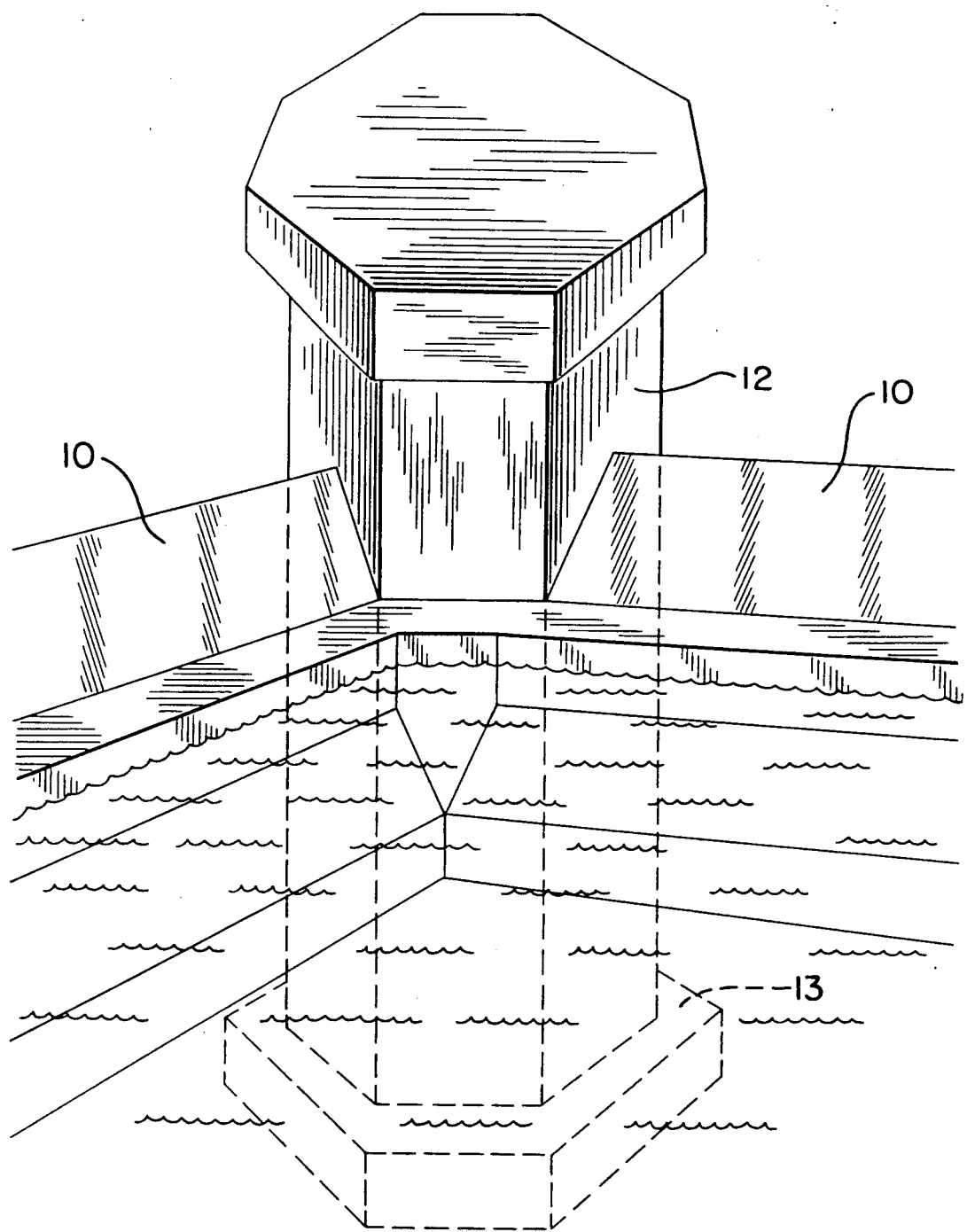
FIG. 5 is a perspective view showing the interconnection of an anchor tower caisson and sea-defense caissons.

FIG. 5 shows an embodiment of a corner anchor tower caisson 12 connected to two sea-defense caissons 10. The anchor tower caisson 12 has a polygonal cross-section and, like the sea-defense caissons 10, is preferably comprised of reinforced concrete. As shown in FIG. 5, the anchor tower caisson 12 has an annular skirt 13 which defines a recessed bottom portion of the caisson. The anchor tower caisson 12 has a much greater height than the sea-defense caissons 10 and extends into the ocean floor a much greater depth than the sea-defense caissons.

A description will now be given, with reference to FIGS. 6 and 7, of the method for constructing a man-made sea defense system according to the present invention. After selection of the desired ocean site, construction of the sea-defense caissons is carried out onshore. The relative dimensions of the sea-defense caissons are determined based primarily on the topography of the ocean floor in the vicinity of the selected site and the maximum-force winds and waves that may be encountered at the site under "worst case" storm conditions. After determination of a set of maximum wave and wind forces and the addition of an appropriate safety factor, the maximum lifting and turning moment forces are calculated for the sea-defense caissons. These forces, in turn, are used to determine the mass and the precise cross-sectional design of the sea-defense caissons for the selected ocean site.

After construction of the sea-defense caissons, the caissons are made sufficiently buoyant to float in the ocean to the selected site. This may be done by attaching buoyancy tanks to the caissons and/or filling air chambers in the caissons with air or other fluid. By way of example, FIG. 6 shows the attachment of buoyancy tanks 26 within the recessed bottom portion 11a of a sea-defense caisson 10 and an air chamber 27 formed in the interior of the caisson. The caissons 10 are then floated to the selected site, for example, by being towed by a tugboat or other vessel.

Figure 6:
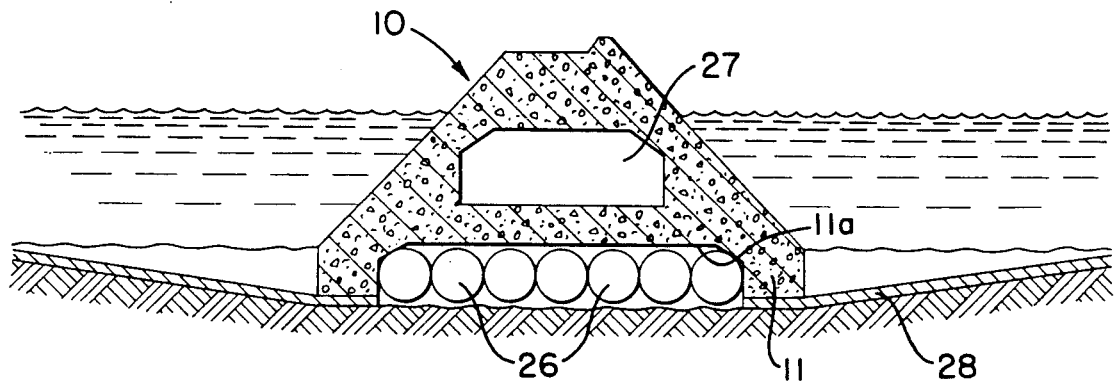
FIG. 6 is an explanatory cross-sectional view for use in explaining the construction of the sea defense system according to the principles of the present invention.
Figure 7:
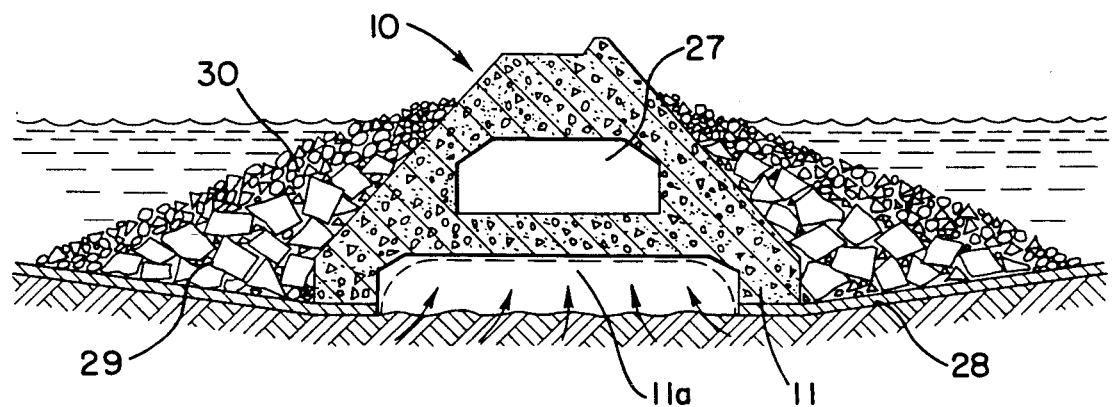
FIG. 7 is an explanatory cross-sectional view for use in explaining the construction of the sea defense system according to the principles of the present invention.

As shown in FIG. 6, the ocean floor at the selected ocean site is suitably prepared to receive the caissons. For this purpose, a channel is dredged in the ocean floor to a depth at least as deep as the height of the caisson skirt 11. The sides of the channel are graded outwardly, in a direction away from the channel, so that the ocean floor gradually slopes upwardly on either side of the channel. The ocean floor is preferably graded to a vertical extent equal to or slightly greater than the height of the caisson skirt 11. In order to maintain the integrity of the ocean floor and to assist in distributing the weight of the caisson and the subsequently deposited material and/or armoring, one or more mats 28 may be laid over the graded areas. As shown, the mats 28 overlie the marginal edge portions of the channel to an extent coterminous with the caisson skirt 11.

After preparation of the ocean floor, the sea-defense caisson 10 is floated into position over the dredged channel and then ballasted down and sunk into place. This condition is shown in FIG. 6. The sinking of the caisson is accomplished by filling the air chamber 27 in the caisson 10 with seawater and progressively removing the buoyancy tanks 26 so that the caisson gradually descends onto the ocean floor. After the caisson 10 is properly positioned in the dredged channel, any remaining buoyancy tanks 26 are removed so that the caisson, due to its weight, settles onto the ocean floor. A material 29 is thereafter deposited on and around the sloped sides of the caisson 10, as shown in FIG. 7. Then a protective armoring 30 of varying size riprap and concrete blocks is deposited over both the material 29 as well as over the exposed side surfaces of the sunken caisson 10. The added material 29 may comprise sand and gravel dredged from the ocean floor or may comprise rocks or even man-made structures such as concrete. Preferably, the added material 29 comprises a first layer of material dredged from the ocean floor covered by overlying layers of rock.

The combined weight of the caisson 10, added material 29 and armoring 30 causes the caisson 10 to sink a certain depth into the ocean floor. The downward pressure exerted by the bottom of the caisson 10 on the ocean floor causes mud silt from the ocean floor to fill the void formed by the skirt 11. Stated otherwise, as the caisson 10 settles on the ocean floor, the seawater within the recessed bottom 11a of the caisson is displaced by mud silt from the ocean floor. The filling of the void with mud silt enables a suction to be created to further anchor the caisson 10 to the ocean floor. Thus if a lifting force or turning moment is applied to the caisson 10, the tendency of the caisson to lift or turn will, in part, be counteracted by the creation of a suction force at the recessed bottom 11a of the caisson.

The sea-defense caisson 10 is designed such that the combined weight of the caisson, added material 29 and armoring 30 is sufficient to offset lifting forces tending to lift the caisson and turning moments tending to turn the caisson which are created by maximum storm winds and waves for which the sea defense system has been designed to withstand at the selected ocean site. By such a design and construction, the caisson 10 is firmly secured in place on the ocean floor. Additional securement is provided by the suction created due to the mud silt filling the voids at the recessed bottoms of the caissons.

In the construction of a sea defense system, the sea-defense caissons 10 are floated to the selected site and successively ballasted down to the ocean floor. After one caisson is properly positioned in place, the next-in-line caisson is ballasted down into position and connected to the previous one. Any suitable connection may be employed, and preferably the facing ends of adjoining caissons are provided with interlocking connectors (not shown) to facilitate the connection. After the main line of sea-defense caissons 10 is secured in place, the anchor tower caissons 12 are floated into position and ballasted down and set in place on the ocean floor and connected to the endmost sea-defense caissons 10, as shown in FIGS. 1–3. The anchor tower caissons 12, like the sea-defense caissons 10, are constructed onshore and floated to the selected site. The anchor tower caissons 12 are also provided with recessed bottoms for creating suction forces to assist in anchoring the caissons to the ocean floor. In the case of the anchor tower caissons 12, the ocean floor preparation requires the dredging of a much deeper channel as these caissons extend to a significantly deeper depth than the sea-defense caissons 10.

After construction of the main line of sea-defense caissons 10 and corner anchor tower caissons 12, other caissons can be connected, as needed, to obtain the desired sea defense system. In the case of the FIG. 1 embodiment, this includes the construction and connection of the secondary line of caissons 10a, 10b and the anchor tower caissons 12a. In the case of the FIG. 2 embodiment, this includes the construction and connection of the storage caissons 15 and, if desired, construction of a dry polder in the enclosed area B. In the case of the FIG. 3 embodiment, this includes construction and connection of the sea-defense caissons 10c.

In accordance with the invention, the sea defense system is constructed so as to be easily de-mounted and removed from the ocean site so as to restore the site to its pre-construction state. To effect de-mounting of the sea defense system, the caissons are disconnected from one another so that each may be separately removed. In order to dislodge the sea-defense caissons 10 and the anchor tower caissons 12 from the ocean floor, compressed air is injected into the recessed bottoms of the caissons through conduits (not shown) to break the suction. The seawater is pumped out of the air chambers formed in the caissons, and air or other fluid is pumped into the chambers to increase the buoyancy of the caissons. Buoyancy tanks or the like are secured to the caissons to impart sufficient buoyancy to float the caissons to the surface where they can be towed away, either for reuse at another site or for destruction. The added material and armoring can then be either removed or spread evenly along the ocean floor. In this manner, the sea defense system can be de-mounted and removed at low cost and without leaving any significant permanent environmental change.

In accordance with the invention, the sea defense system can be economically constructed in the open ocean at sites having mean-low-water depths up to 150 feet. In theory, the sea defense system could be constructed for use at even deeper depths, though it is estimated that the size and cost of the caissons would make construction impractical at depths beyond 150 feet. The sea defense system is particularly suited for use at mean-low-water depths in the range of 20 to 150 feet, especially at depths in the range of 20 to 80–90 feet.

The present invention has been described with reference to particular embodiments thereof, and obvious variations and modifications will be readily apparent to those of ordinary skill in the art. The present invention is intended to cover all such obvious various variations and modifications which fall within the spirit and scope of the appended claims.

I claim:

1. A method of constructing a man-made sea defense system at a preselected ocean site in the open ocean, comprising the steps:

providing a plurality of floatable sea-defense caissons, each caisson having a top, a bottom, a pair of opposed sloped sides sloping outwardly in a direction from the top to the bottom, and a pair of opposed ends, the caissons being connectable in end-to-end relation to form a sea defense system in the ocean;

transporting the caissons by floating them in the ocean to a preselected ocean site in the open ocean;

preparing the ocean floor at the preselected ocean site to receive the caissons including dredging a channel in the ocean floor for receiving the bottoms of the caissons;

sinking the caissons onto the prepared ocean floor and connecting the sunken caissons in a line in end-to-end relation so that the bottoms of the caissons seat in the channel on the ocean floor and the tops of the caissons extend above the ocean surface;

adding material onto and around the sloped sides of the caissons to effectively secure the caissons to the ocean floor;

providing a pair of floatable anchor tower caissons, each anchor tower caisson having a top, a bottom, a sidewall and a height greater than that of the sea-defense caissons and being configured to connect to the ends of the sea-defense caissons;

transporting the anchor tower caissons by floating them in the ocean to the preselected ocean site;

sinking the anchor tower caissons onto the prepared ocean floor and connecting the sunken anchor tower caissons to the respective ends of the two opposite endmost sea-defense caissons in the line of sea-defense caissons so that the bottoms of the anchor tower caissons rest on the ocean floor and the tops of the anchor tower caissons extend above the ocean surface and above the tops of the sea-defense caissons; and adding material onto and around the sidewalls of the anchor tower caissons to effectively anchor all of the caissons to the ocean floor.

2. A method according to claim 1; wherein the steps of sinking and connecting the sea-defense caissons include connecting the sea-defense caissons in end-to-end relation in a line which curves outwardly in the general direction of the prevailing waves and winds at the preselected ocean site.

3. A method according to claim 2; wherein the line of sea-defense caissons has a curvature the extent of which covers the full range of directions from which maximum winds and waves can be expected at the preselected ocean site.

4. A method according to claim 1; wherein the preparing step includes grading the sidewalls of the channel.

5. A method according to claim 4; wherein the preparing step includes laying a mat over the graded sidewalls to help maintain the integrity of the ocean floor and assist in distributing the weight of the caissons and added material.

6. A method according to claim 1; wherein the sea-defense caissons have recessed bottoms; and the first adding step comprises adding material in an amount sufficient to force the sea-defense caissons downwardly to cause the caisson recessed bottoms to adhere by suction to the ocean floor.

7. A method according to claim 1; further including the steps:
providing a plurality of floatable storage caissons, each storage caisson having a hollow interior portion for storing therein bulk materials and having a top, a bottom, a pair of opposed sides and a pair of opposed ends;
transporting the storage caissons by floating them in the ocean to the preselected ocean site; and
sinking the storage caissons onto the ocean floor on the leeward side of the line of sea-defense caissons and connecting together the sunken storage caissons so that the bottoms of the storage caissons rest on the ocean floor and the tops of the storage caissons extend above the ocean surface.

8. A method according to claim 7; wherein the steps of sinking and connecting the storage caissons include connecting at least one end of one storage caisson to the sloped side of one sea-defense caisson on the leeward side of the line of sea-defense caissons.

9. A method according to claim 7; wherein the steps of sinking and connecting the storage caissons include connecting the storage caissons to the line of sea-defense caissons in a closed loop configuration to define a sheltered area completely bounded by the connected together sea-defense and storage caissons.

10. A method according to claim 9; including removing the ocean water from the sheltered area and then adding dry material to the sheltered area to form a dry polder.

11. A method according to claim 1; including adding protective armoring over the added material.

12. A method according to claim 11; including determining the weight of the caissons, added material and armoring so that their combined effective weight is sufficient to offset lifting forces tending to lift the caissons and turning moments tending to turn the caissons which are created by maximum storm winds and waves for which the sea defense system has been designed to withstand at the preselected ocean site.

13. A method according to claim 1; wherein the preselected ocean site has a mean-low-water depth in the range of 20 to 150 feet.

14. A method according to claim 1; wherein the preselected ocean site has a mean-low-water depth in the range of 30 to 80 feet.

15. A method according to claim 2; further including the steps:
providing at least two floatable storage caissons, each storage caisson having a hollow interior portion for storing therein bulk materials;
transporting the storage caissons by floating them in the ocean to the preselected ocean site; and
sinking the storage caissons onto the ocean floor on the leeward side of the curved line of sea-defense caissons and connecting the sunken storage caissons in a line that extends radially inwardly toward the center of curvature of the curved line of sea-defense caissons to thereby strengthen the integrity of the sea defense system.

* * * * *